UNITED STATES PATENT OFFICE.

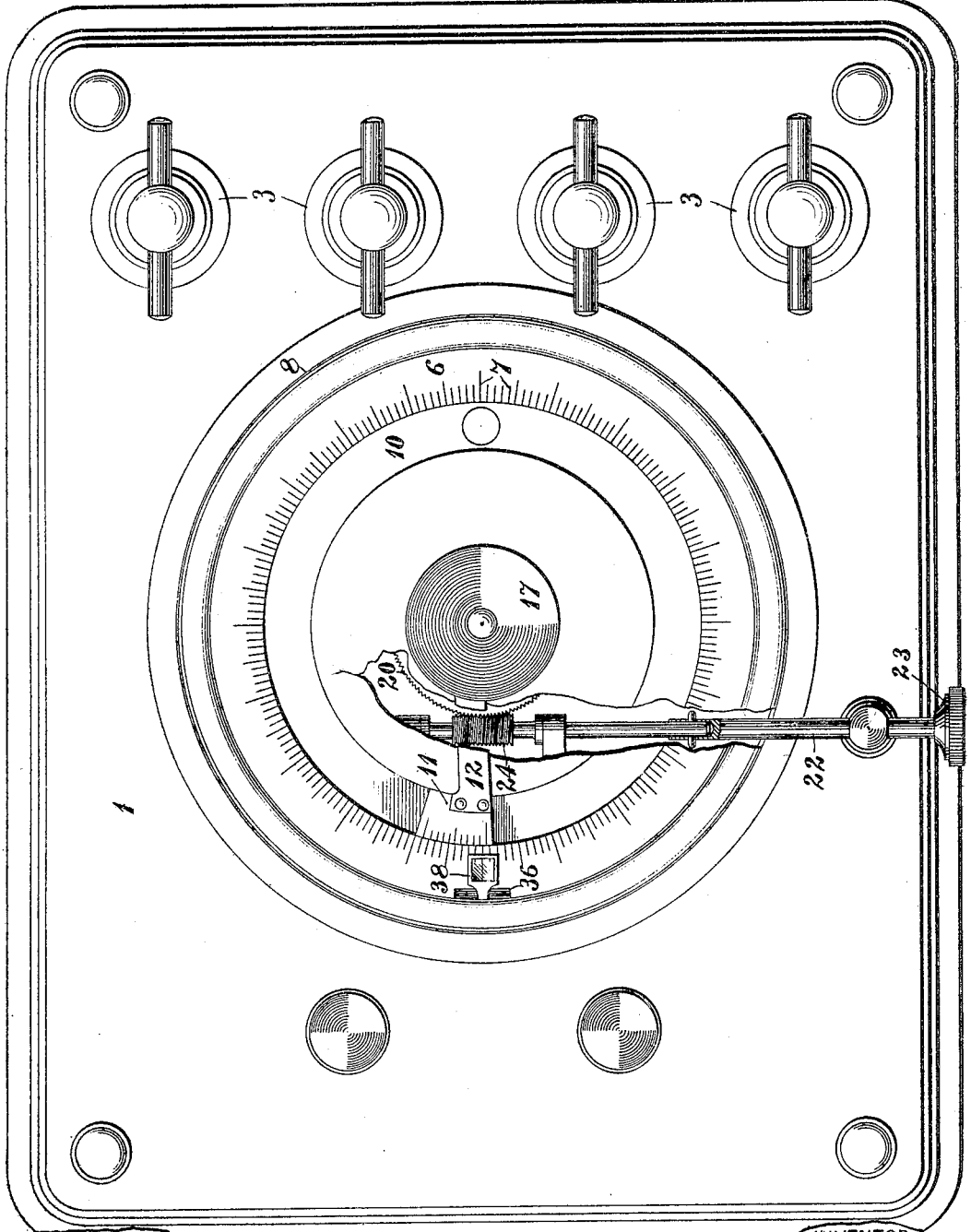

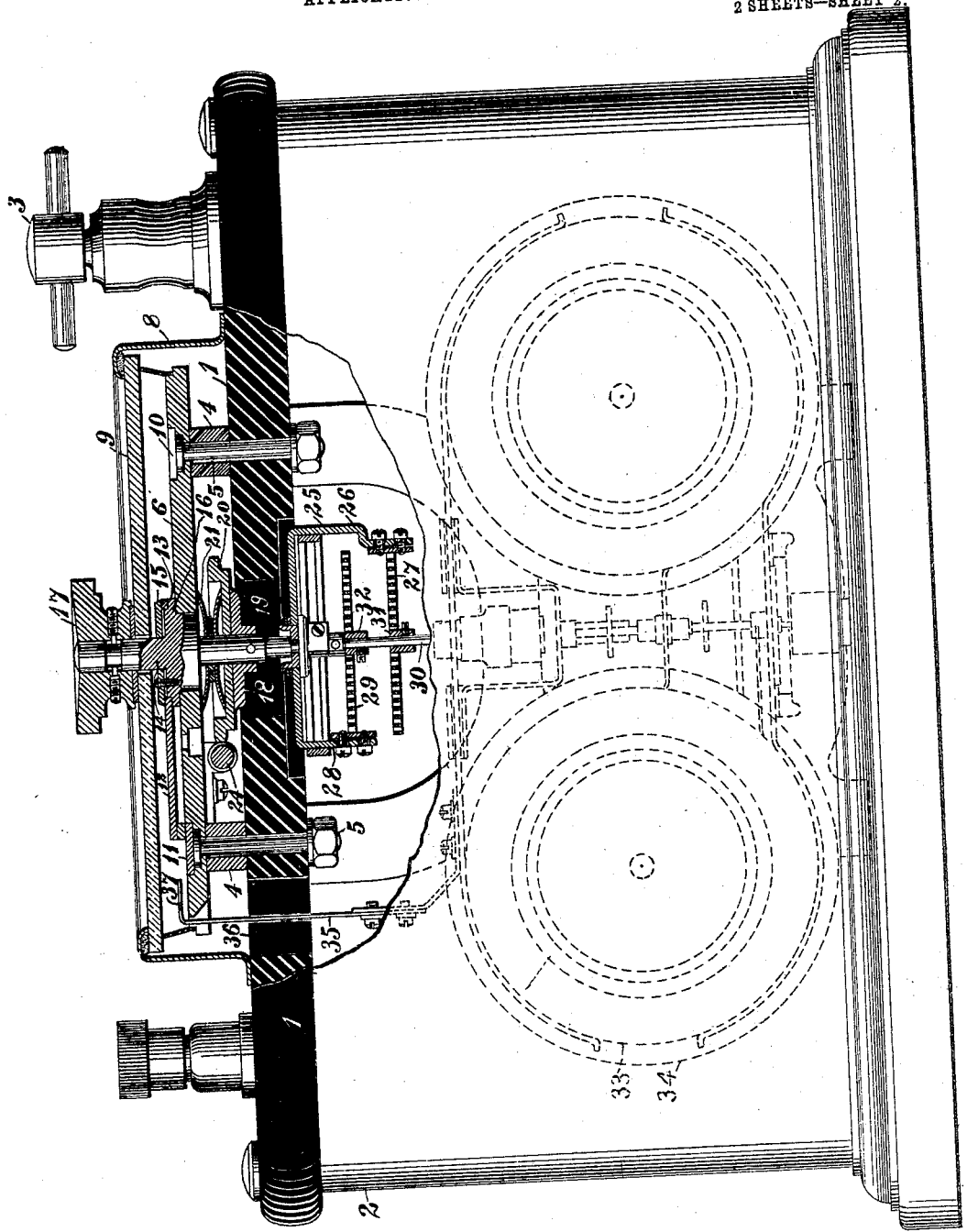

FRANK CONRAD, OF EDGEWOOD PARK, PENNSYLVANIA, ASSIGNOR TO WESTINGHOUSE ELECTRIC & MANUFACTURING COMPANY, A CORPORATION OF PENNSYLVANIA.

MEASURING INSTRUMENT.

No. 798,167.       Specification of Letters Patent.       Patented Aug. 29, 1905.

Application filed September 22, 1904. Serial No. 225,499.

*To all whom it may concern:*

Be it known that I, FRANK CONRAD, a citizen of the United States, and a resident of Edgewood Park, in the county of Allegheny and State of Pennsylvania, have invented a new and useful Improvement in Measuring Instruments, of which the following is a specification.

My invention relates to measuring instruments, and more particularly to instruments for measuring electrical energy, though not necessarily restricted to that specific use.

The object of my invention is to provide a simple, easily-manipulated, and reliable means for effecting both coarse or approximate and fine or exact adjustments of the movable index of an instrument of precision.

In the accompanying drawings, Figure 1 is a plan view of a watt-dynamometer constructed in accordance with my invention, portions of certain parts being broken away. Fig. 2 is a view, partially in side elevation and partially in section, of the instrument shown in Fig. 1.

The front or top plate 1 of the casing 2 of the instrument is provided with a set of binding-posts 3, as is usual in this class of instruments. Supported upon the plate 1 by means of tubular blocks 4 and bolts 5 is a frame-plate 6, the outer edge of which is here shown as provided with an annular graduated scale 7. The plate 6 is inclosed by means of a supplemental casing comprising a metal rim 8 and a glass face-plate 9. The plate 6 is provided with a shallow annular groove 10 in its outer face, in which is fitted a movable index and vernier-scale plate 11. This index and vernier-scale plate is rigidly fastened to the outer end of an arm 12, the inner end of which is clamped between the enlarged portion 13 of an arbor 14 and an annular plate 15. The enlarged portion 13 is provided with a shoulder 16, that rests upon the outer face of the plate 6, the smaller portion of the enlargement projecting through an opening of substantially the same size in the plate. The outer end of the arbor 14 is provided with a milled head or knob 17, by means of which the arbor may be turned.

A friction-disk 18 is mounted upon the arbor and securely fastened thereto within an opening 19 in the plate 1. Loosely mounted upon the arbor 14 and resting upon the friction-plate 18 is a worm-wheel 20, and between the outer face of the worm-wheel and the inner face of the plate 6 is located a double spring-washer 21. Mounted in suitable bearings in the frame is a shaft 22, having at its outer end a milled head or knob 23 and near its inner end a worm 24, that meshes with the worm-wheel 20.

Fastened to the inner end of the arbor 14 is a bar or plate 25, the ends of which are bent at substantially right angles to the body portion. One of these ends 26 constitutes an abutment for the outer end of a spiral spring 27, and the other end 28 constitutes a similar abutment for the outer end of a second spiral spring 29, these springs being oppositely coiled and having their inner ends respectively connected to a shaft or spindle 30 by means of collars 31 and 32. The shaft or spindle 30 is rigidly connected to a movable member comprising one or more coils 33, which is in inductive relation to stationary coils 34, so that when current is sent through these coils the interaction between them will cause the movable member to turn rotatively, and thus rotate the shaft or spindle 30 against the action of the springs 27 and 29. The movable member 33 is provided with a pointer 35, which projects through an opening 36 in the plate 6 and the outer end 37 of which is bent substantially at right angles to the body portion to project over the scale 7 and is provided with an index 38.

In using the instrument the parts are first so adjusted that the index 38 of the pointer 35 will coincide with the zero-line of the scale 7, and the vernier-scale 11 will also be so adjusted that its index will coincide with the zero-line of the scale 7. If the current or energy to be measured is now supplied to the coils of the instrument, the pointer 35 will be deflected, and the arm 12 and its index and vernier-scale 11 will be turned, by means of the knob or head 17, until the index 38 is returned to approximately the zero position of the stationary scale 7, this approximate adjustment being readily effected by reason of the fact that the head or knob 17 is rigidly connected to the outer end of the arbor 14, and the friction exerted between the worm-wheel 20 and the disk 18 by the spring-washer 21 may be readily overcome. In order to secure a fine or accurate adjustment, so that the reading may be absolutely correct, the vernier-scale and index may be turned by means of the knob or head 23, the shaft 22, the worm 24, and the worm-wheel 20, since the friction produced between the worm-wheel 20 and the disk 18 by the spring-washer 21 is sufficient to insure the turning of the arbor 14, and with it the index and vernier-scale plate.

The details of construction may be varied from what is shown without departing from my invention, and I desire it also to be understood that the invention is not necessarily limited to instruments of precision which are utilized for measuring electricity or electrical energy, since it is possible that the devices here shown or their substantial equivalents may be found useful in connection with instruments of precision employed for other purposes.

I claim as my invention—

1. In a measuring instrument, the combination with a rotatable member having a shaft provided with an annular projection, of a worm-wheel loosely surrounding said shaft and resting upon said annular projection, a stationary frame part, a spring-washer interposed between said frame part and said worm-wheel, and a worm meshing with said worm-wheel.

2. In a measuring instrument, the combination with a rotatable member having an indicating-pointer, of a stationary part, an arbor having a disk fixed thereon, a worm-wheel loosely surrounding the arbor and resting upon said disk, a spring-washer interposed between said stationary part and said worm-wheel, and a worm meshing with said worm-wheel.

3. In a measuring instrument, the combination with a frame-plate, and a rotatable member having an arbor provided with a disk, of a worm-wheel resting upon said disk, a spring-washer interposed between the said frame-plate and said worm-wheel, and a worm meshing with said worm-wheel.

4. In a measuring instrument, the combination with a frame-plate, and a rotatable member provided with an arbor having resilient connection therewith and having a shoulder that rests upon said frame-plate, of a disk rigidly secured to said arbor, a worm-wheel loosely mounted thereon, a spring-washer interposed between the said frame-plate and said worm-wheel, and a worm meshing with said worm-wheel.

5. In a measuring instrument, the combination with a frame-plate and a rotatable member, of an arbor having a shoulder that rests upon said frame-plate, a resilient connection between said rotatable member and said arbor, a worm-wheel loosely mounted on said arbor, a spring-washer interposed between the said frame-plate and said worm-wheel, and a worm meshing with said worm-wheel.

6. In a measuring instrument, the combination with a rotatable member having an indicating-pointer, of a stationary frame-plate, an arbor having a shoulder that rests upon said frame-plate and carries an index and vernier, a disk rigidly secured to said arbor, a worm-wheel loosely mounted thereon, a spring-washer interposed between the frame-plate and said worm-wheel, and a worm meshing with said worm-wheel.

7. In a measuring instrument, the combination with a frame and a movable member having a pointer, of an arbor having a friction-disk, one or more springs connecting said movable member and said arbor, a worm-wheel loosely surrounding said arbor, a spring-washer for holding said worm-wheel in engagement with said friction-disk, and a worm meshing with said worm-wheel.

8. In a measuring instrument, the combination with a movable member having a pointer, a movable scale and a stationary scale, of an arbor rigidly connected to said movable scale and having a yielding, resilient connection with said movable member and a worm-gear having a yielding, frictional connection with said arbor.

9. In a measuring instrument, the combination with a frame and a movable member having a pointer, of a fixed scale, a movable scale, an arbor having a rigid connection to the movable scale and a yielding, resilient connection to the movable member, a knob for effecting approximate adjustment of the movable scale and a worm-gear having frictional connection with the arbor for effecting accurate adjustment of said scale.

10. In an instrument of precision, the combination with a power-actuated member having a pointer, a stationary scale, a movable scale and an arbor rigidly connected to said movable scale and having a yielding, resilient connection to said power-actuated member, of a knob or handle for effecting approximate adjustment of the movable scale, and a worm-gear having a frictional connection with the arbor to effect accurate adjustment of the movable scale.

11. In an instrument of precision, the combination with a power-actuated member having a pointer, of a stationary scale, a movable scale, an arbor rigidly connected to the movable scale and having a knob or handle, one or more springs between the arbor and the power-actuated member, and a worm-gear having a frictional connection with the arbor to effect accurate adjustment of the movable scale.

12. In a measuring instrument, the combination with a movable member having a pointer, of a movable index and a stationary scale, an arbor rigidly connected to said movable index and having a yielding, resilient connection with said movable member, and a slow-speed, actuating device having a yielding, frictional connection with said arbor.

13. In an instrument of precision, the combination with a power-actuated member having a pointer, of a stationary scale, a movable scale and an arbor rigidly connected to said movable scale and having a yielding, resilient connection to said power-actuated member, a knob or handle for effecting approximate adjustment of the movable scale, and a slow-speed, actuating device having a frictional connection with the arbor to effect accurate adjustment of the movable scale.

14. In an instrument of precision, the combination with a power-actuated member having a pointer, of a stationary scale, a movable index, an arbor rigidly connected to the movable scale and having a knob or handle, one or more springs between the arbor and the power-actuated member, and a slow-speed actuating device having a frictional connection with the arbor to effect accurate adjustment of the movable index.

15. In a measuring instrument, the combination with a power-actuated member having a pointer, of a stationary scale adjacent to said pointer, an arbor having an index adjacent to said scale, a yielding, resilient connection between said power-actuated member and said arbor, and a slow-speed actuating device having a yielding, frictional connection with said arbor.

16. In a measuring instrument, the combination with a movable member having a pointer, of an index and a scale that are relatively movable, an arbor rigidly connected to one of said parts and having a yielding, resilient connection with said movable member, and a slow-speed actuating device having a yielding frictional connection with said arbor.

17. In a measuring instrument, the combination with a power-actuated member having an indicator, of an index and a scale that are relatively movable, an arbor having an invariable, operative connection to one of said parts and having a yielding, resilient connection to the power-actuated member, a slow-speed actuating device for said arbor, and means for turning the arbor independently of said device.

In testimony whereof I have hereunto subscribed my name this 11th day of August, 1904.

FRANK CONRAD.

Witnesses:
  A. M. COPLEY,
  BIRNEY HINES.